(12) United States Patent
Sugiura et al.

(10) Patent No.: US 8,399,151 B2
(45) Date of Patent: *Mar. 19, 2013

(54) FUEL CELL WITH BUFFER-DEFINED FLOW FIELDS

(75) Inventors: Seiji Sugiura, Utsunomiya (JP);
  Yasuhiro Watanabe, Kawaguchi (JP);
  Takahiro Takai, Utsunomiya (JP); Shuji Sato, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 188 days.

This patent is subject to a terminal disclaimer.

(21) Appl. No.: 12/794,409

(22) Filed: Jun. 4, 2010

(65) Prior Publication Data
US 2010/0310957 A1 Dec. 9, 2010

(30) Foreign Application Priority Data
Jun. 5, 2009 (JP) ................................ 2009-136006

(51) Int. Cl.
  H01M 8/04 (2006.01)
  H01M 8/10 (2006.01)
  H01M 8/22 (2006.01)
(52) U.S. Cl. .................... 429/514; 429/457; 429/483
(58) Field of Classification Search .......... 429/454, 429/434, 468, 480, 518, 457, 514, 483
See application file for complete search history.

(56) References Cited

U.S. PATENT DOCUMENTS

| | | | |
|---|---|---|---|
| 2005/0255364 A1* | 11/2005 | Cho et al. ................ | 429/38 |
| 2006/0204807 A1* | 9/2006 | Kosaka et al. ............. | 429/26 |
| 2010/0129694 A1* | 5/2010 | Sugiura et al. ............. | 429/30 |

FOREIGN PATENT DOCUMENTS

| | | |
|---|---|---|
| JP | 62-163264 | 7/1987 |
| JP | 8-222237 | 8/1996 |
| JP | 2001-110434 | 4/2001 |
| JP | 2006-147255 | 6/2006 |
| JP | 2008-123968 | 5/2008 |

OTHER PUBLICATIONS

Japanese Office Action for Application No. 2009-136006, dated Aug. 30, 2011.

* cited by examiner

*Primary Examiner* — Basia Ridley
*Assistant Examiner* — Kenneth Douyette
(74) *Attorney, Agent, or Firm* — Nelson Mullins Riley & Scarborough LLP; Anthony A. Laurentano

(57) ABSTRACT

An oxygen-containing gas flow field is formed on a surface of a cathode side metal separator of a fuel cell. The oxygen-containing gas flow field is connected between an oxygen-containing gas supply passage and an oxygen-containing gas discharge passage. A coolant flow field is formed on the other surface of the cathode side metal separator, on the back of the oxygen-containing gas flow field. The cathode side metal separator has linear guide ridges protruding from an intermediate height area toward the oxygen-containing gas flow field to form a continuous guide flow field, and bosses protruding from the intermediate height area toward the coolant flow field to form an embossed flow field.

5 Claims, 14 Drawing Sheets

FUEL CELL WITH BUFFER-DEFINED FLOW FIELDS

CROSS-REFERENCE TO RELATED APPLICATION

This application is based upon and claims the benefit of priority from Japanese Patent Application No. 2009-136006 filed on Jun. 5, 2009, of which the contents are incorporated herein by reference.

BACKGROUND OF THE INVENTION

1. Field of the Invention

The present invention relates to a fuel cell formed by stacking an electrolyte electrode assembly and a metal separator in a form of a corrugated plate. The electrolyte electrode assembly includes a pair of electrodes, and an electrolyte is interposed between the electrodes. A reactant gas flow field as a passage of a fuel gas or an oxygen-containing gas, and a coolant flow field as a passage of a coolant are formed on both surfaces of the metal separator.

2. Description of the Related Art

For example, a solid polymer electrolyte fuel cell employs an electrolyte membrane. The electrolyte membrane is a polymer ion exchange membrane. The electrolyte membrane is interposed between an anode and a cathode to form a membrane electrode assembly (MEA). The membrane electrode assembly is sandwiched between a pair of separators to form a unit cell for generating electricity. In use, normally, a predetermined number of unit cells are stacked together to form a fuel cell stack.

In the fuel cell as described, a fuel gas flow field is formed in a surface of one separator facing the anode for supplying a fuel gas to the anode, and an oxygen-containing gas flow field is formed in a surface of the other separator facing the cathode for supplying an oxygen-containing gas to the cathode. Further, a coolant flow field is formed between the separators for supplying a coolant along surfaces of the separators.

In the case where metal separators are used as the separators, by providing grooves as the fuel gas flow field on one surface of the metal separator facing the anode, ridges as the back side of the grooves are formed on the other surface of the metal separator. Further, by forming grooves as the oxygen-containing gas flow field on one surface of the metal separator facing the cathode, ridges as the back side of the grooves are formed on the other surface of the metal separator.

For example, a fuel cell separator is disclosed in Japanese Laid-Open Patent Publication No. 08-222237. As shown in FIG. 14, the fuel cell separator includes a separator plate 1 and a separator frame 2. The separator plate 1 is made of metal, and bosses and dimples are formed on the separator plate 1. Specifically, a large number of projections 3, 4 are formed on the front and back surfaces of the separator plate 1 at intervals of several millimeters. When a fuel cell stack is assembled, the top portions of the projections 3, 4 tightly contact unit cells 5. A fuel gas flow field 6 and an oxygen-containing gas flow field 7 are formed between the separator plate 1 and the adjacent unit cells 5. The fuel gas flow field 6 is formed by the projections 3 of the separator plate 1, and the oxygen-containing gas flow field 7 is formed by the projections 4 of the separator plate 1.

In the above separator plate 1, the fuel gas flow field 6 is formed by a large number of the projections 3, and the oxygen-containing gas flow field 7 is formed by a large number of the projections 4. Therefore, the water produced in the power generation tends to be retained between the projections 3 or between the projections 4. At this time, since the fuel gas and the oxygen-containing gas flows between the projections 3 and the projections 4 around the water produced in the power generation reaction, the water may not be discharged smoothly. Therefore, the flows of the fuel gas and the oxygen-containing gas are inhibited, and the power generation performance is poor.

Further, in the case where water is introduced into the fuel cell stack from the outside, the water is retained, and cannot be discharged smoothly. Therefore, the power generation performance is degraded.

SUMMARY OF THE INVENTION

The present invention has been made to solve the problems of this type, and an object of the present invention is to provide a fuel cell using a metal separator in a form of a corrugated plate in which the performance of discharging water produced in the power generation reaction from a reactant gas flow field is improved, and a coolant is distributed suitably in a coolant flow field.

The present invention relates to a fuel cell formed by stacking an electrolyte electrode assembly and a metal separator in a form of a corrugated plate in a stacking direction. The electrolyte electrode assembly includes a pair of electrodes and an electrolyte interposed between the electrodes. A reactant gas flow field as a passage of a fuel gas or an oxygen-containing gas is formed on one surface of the metal separator, and a fluid flow field as a passage of the fuel gas, the oxygen-containing gas, or a coolant is formed on another surface of the metal separator.

The metal separator includes a first buffer protruding from an intermediate height area toward the reactant gas flow field to form a continuous guide flow field, and a second buffer protruding from the intermediate height area toward the fluid flow field to form an embossed flow field.

In the present invention, since the metal separator in the form of the corrugated plate has the first buffer including the continuous guide flow field protruding from the intermediate height area toward the reactant gas flow field, the reactant gas does not flow around the water produced in the power generation reaction in the reactant gas flow field. Therefore, the water produced in the power generation reaction is discharged smoothly and reliably by the reactant gas. Thus, the desired power generation performance is maintained suitably.

Further, the metal separator in the form of the corrugated plate has the second buffer including the embossed flow field protruding from the intermediate height area toward the fluid flow field. Therefore, the coolant is distributed efficiently.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
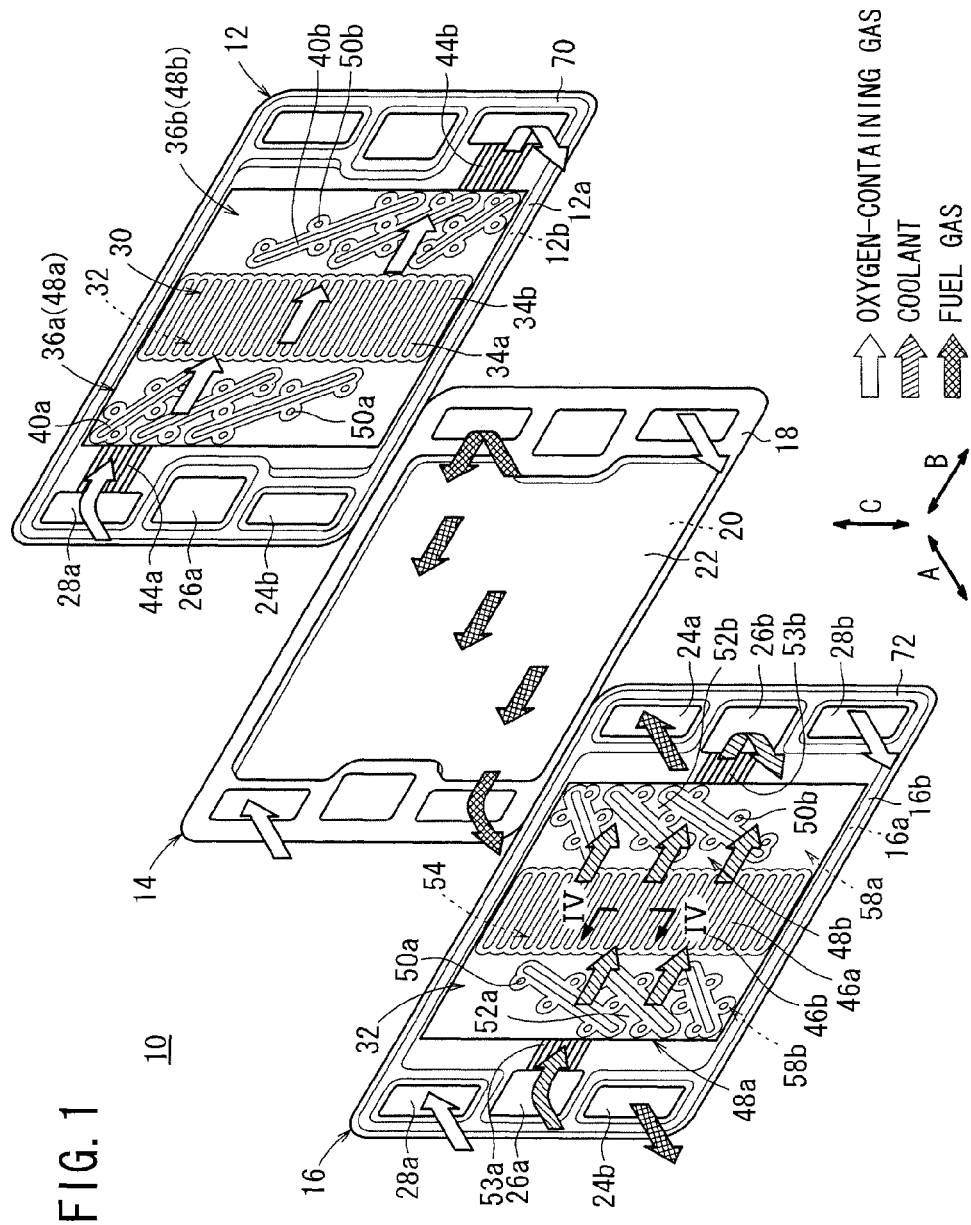
FIG. 1 is an exploded perspective view showing main components of a fuel cell according to a first embodiment of the present invention.

As shown in FIG. 1, a fuel cell 10 according to a first embodiment of the present invention includes a cathode side metal separator 12, a membrane electrode assembly (electrolyte electrode assembly) (MEA) 14, and an anode side metal separator 16.

For example, the cathode side metal separator 12 and the anode side metal separator 16 are made of steel plates, stainless steel plates, aluminum plates, plated steel sheets, or metal plates having anti-corrosive surfaces by surface treatment. The cathode side metal separator 12 and the anode side metal separator 16 are formed by corrugating metal plates under pressure to have ridges and grooves.

For example, each of the cathode side metal separator 12 and the anode side metal separator 16 includes a cathode 20, an anode 22, and a solid polymer electrolyte membrane 18 interposed between the cathode 20 and the anode 22. The solid polymer electrolyte membrane 18 is formed by impregnating a thin membrane of perfluorosulfonic acid with water, for example.

Each of the cathode 20 and the anode 22 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the cathode 20 and the electrode catalyst layer of the anode 22 are fixed to both surfaces of the solid polymer electrolyte membrane 18, respectively.

At one end of the fuel cell 10 in a longitudinal direction indicated by the arrow B, a fuel gas supply passage 24*a* for supplying a fuel gas such as a hydrogen containing gas, a coolant discharge passage 26*b* for discharging a coolant, and an oxygen-containing gas discharge passage 28*b* for discharging an oxygen-containing gas are provided. The fuel gas supply passage 24*a*, the coolant discharge passage 26*b*, and the oxygen-containing gas discharge passage 28*b* extend through the fuel cell 10 in the direction indicated by the arrow A.

At the other end of the fuel cell 10 in the longitudinal direction indicated by the arrow B, an oxygen-containing gas supply passage 28*a* for supplying the oxygen-containing gas, a coolant supply passage 26*a* for supplying the coolant, and a fuel gas discharge passage 24*b* for discharging the fuel gas are provided. The oxygen-containing gas supply passage 28*a*, the coolant supply passage 26*a*, and the fuel gas discharge passage 24*b* extend through the fuel cell 10 in the direction indicated by the arrow A.

Figure 2:
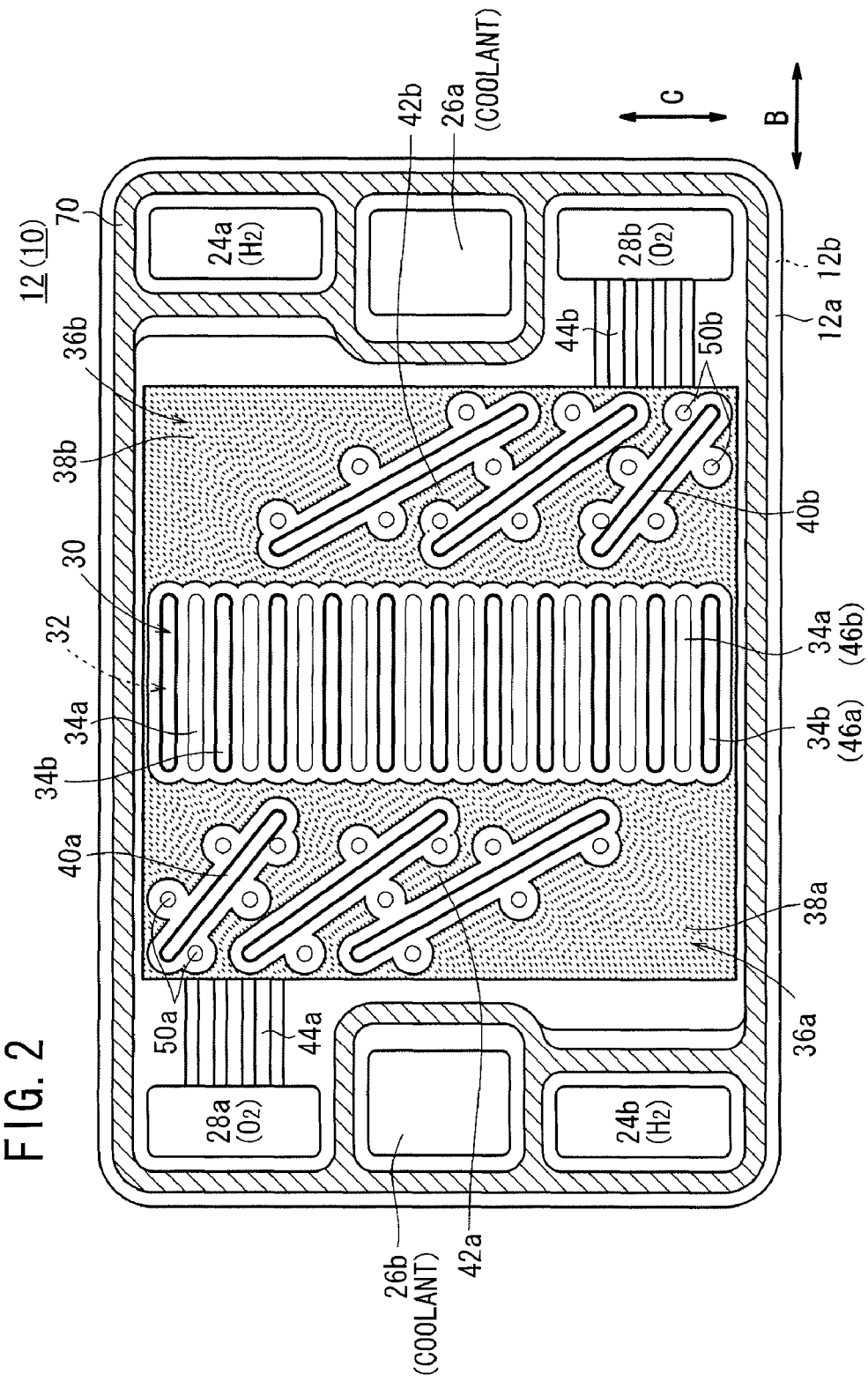
FIG. 2 is a view showing one surface of a cathode side metal separator of the fuel cell.

As shown in FIGS. 1 and 2, the cathode side metal separator 12 has an oxygen-containing gas flow field (reactant gas flow field) 30 on its surface 12*a* facing the membrane electrode assembly 14. The oxygen-containing gas flow field 30 is connected between the oxygen-containing gas supply passage 28*a* and the oxygen-containing gas discharge passage 28*b*. A coolant flow field 32 is formed on another surface 12*b* of the cathode side metal separator 12, on the back of the oxygen-containing gas flow field 30.

The oxygen-containing gas flow field 30 includes a plurality of straight flow grooves 34*a* along the power generation surface extending in the direction indicated by the arrow B. The straight flow grooves 34*a* are arranged in the direction indicated by the arrow C. An inlet buffer (first buffer) 36*a* and an outlet buffer (first buffer) 36*b* are provided adjacent to the inlet and the outlet of the straight flow grooves 34*a*, respectively. The straight flow grooves 34*a* are formed between straight flow field ridges (linear flow field ridges) 34*b* protruding from the surface 12*a*.

It should be noted that the present invention is at least applicable to the outlet buffer 36*b*. Hereinafter, it is assumed that the present invention is applicable to the inlet buffer 36*a* in addition to the outlet buffer 36*b*.

The inlet buffer 36*a* includes linear guide ridges 40*a* protruding from an intermediate height area 38*a* toward the oxygen-containing gas flow field 30. The linear guide ridges 40*a* form a continuous guide flow field 42*a*. The inlet buffer 36*a* is connected to the oxygen-containing gas supply passage 28*a* through a bridge area 44*a*. For example, the bridge area 44*a* is formed by corrugating a seal member. Other bridge areas as described later have the same structure.

The outlet buffer 36*b* includes linear guide ridges 40*b* protruding from an intermediate height area 38*b* toward the oxygen-containing gas flow field 30. The linear guide ridges 40*b* form a continuous guide flow field 42*b*. The outlet buffer 36*b* is connected to the oxygen-containing gas discharge passage 28*b* through a bridge area 44*b*.

Figure 3:
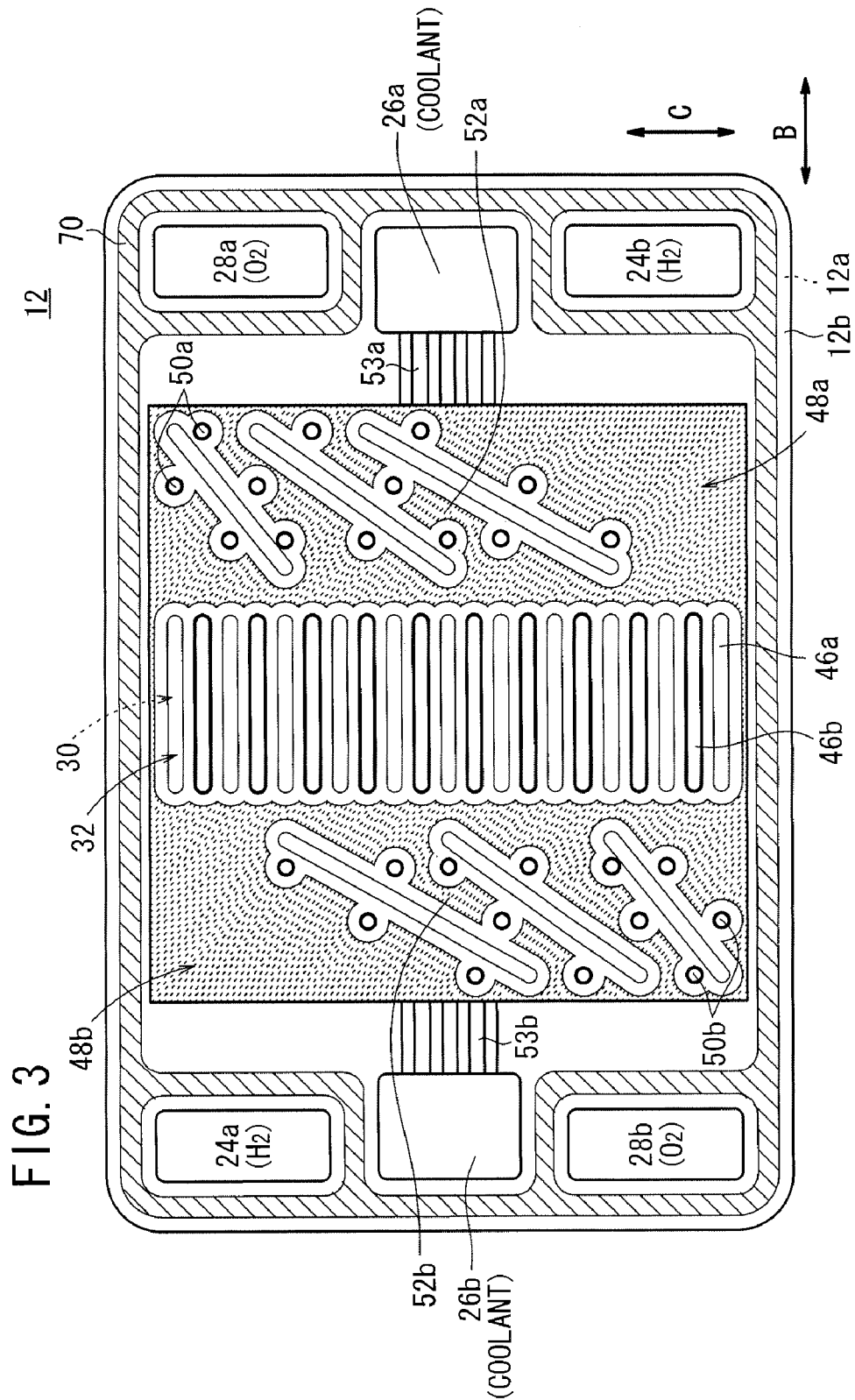
FIG. 3 is a view showing the other surface of the cathode side metal separator.

As shown in FIG. 3, the coolant flow field (fluid flow field) 32 is formed on the other surface 12*b* of the cathode side metal separator 12, on the back of the oxygen-containing gas flow field 30. The coolant flow field 32 includes a plurality of straight flow grooves 46*a* along the power generation surface extending in the direction indicated by the arrow B. The straight flow grooves 46*a* are arranged in the direction indicated by the arrow C. An inlet buffer (second buffer) 48*a* and an outlet buffer (second buffer) 48*b* are provided adjacent to the inlet and the outlet of the straight flow grooves 46*a*, respectively.

Figure 4:
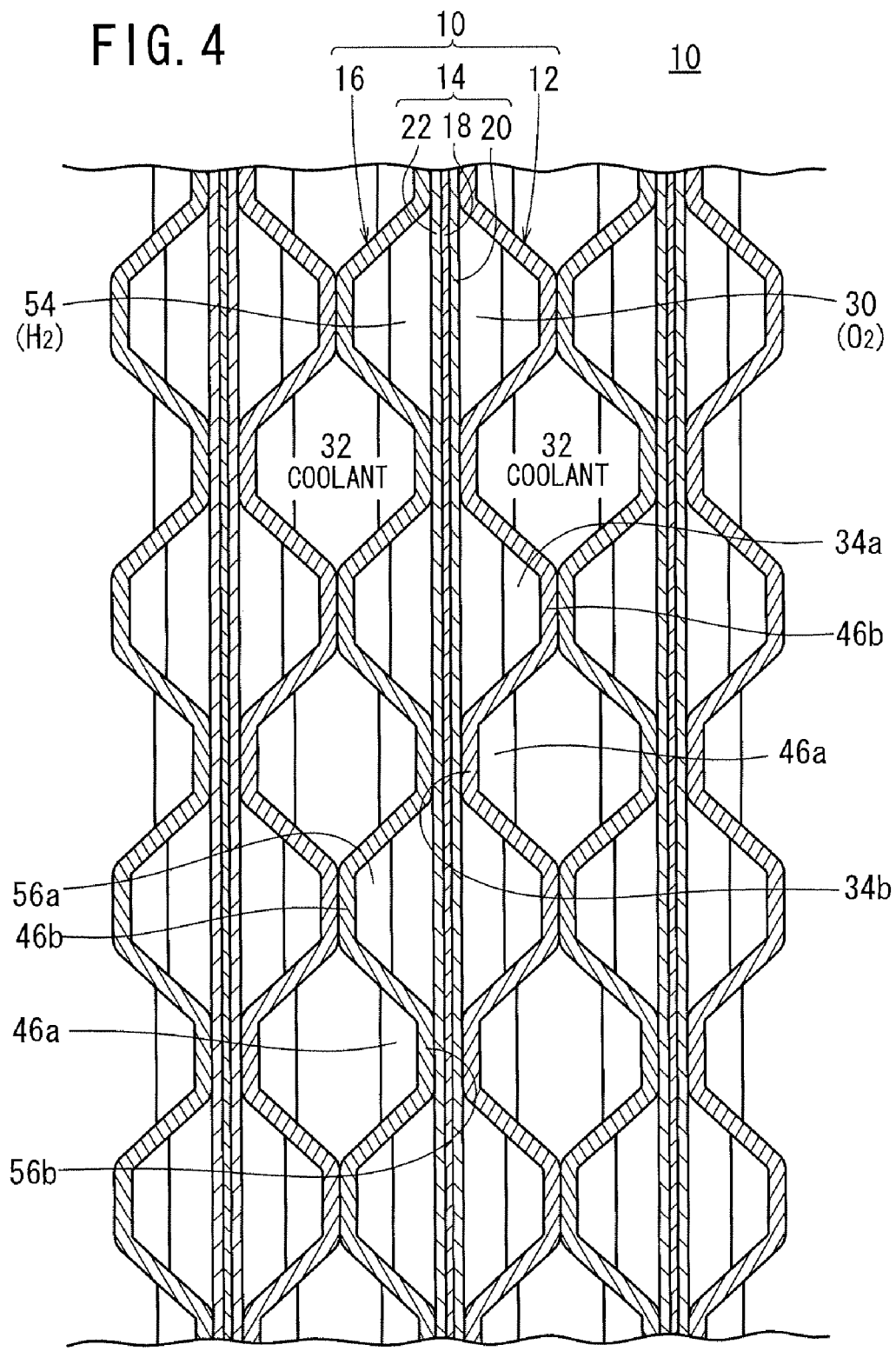
FIG. 4 is a cross sectional view showing the fuel cell, taken along a line IV-IV in FIG. 1.

The straight flow grooves 46*a* are formed between straight flow field ridges (linear flow field ridges) 46*b* protruding from the surface 12*b*. The straight flow grooves 46*a* are formed on the back of the straight flow field ridges 34*b*, and the straight flow field ridges 46*b* are formed on the back of the straight flow grooves 34*a* (see FIG. 4). The inlet buffer 48*a* is formed on the back of the inlet buffer 36*a*, and the outlet buffer 48*b* is formed on the back of the outlet buffer 36*b*.

Figure 5:
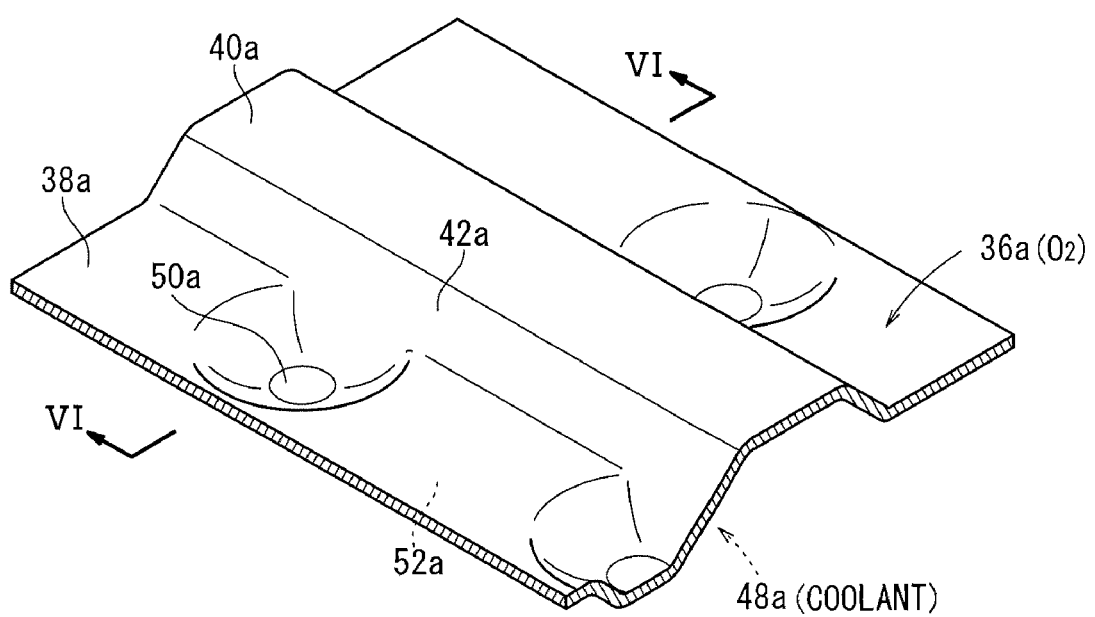
FIG. 5 is a perspective view showing an inlet buffer of the cathode side metal separator.
Figure 6:
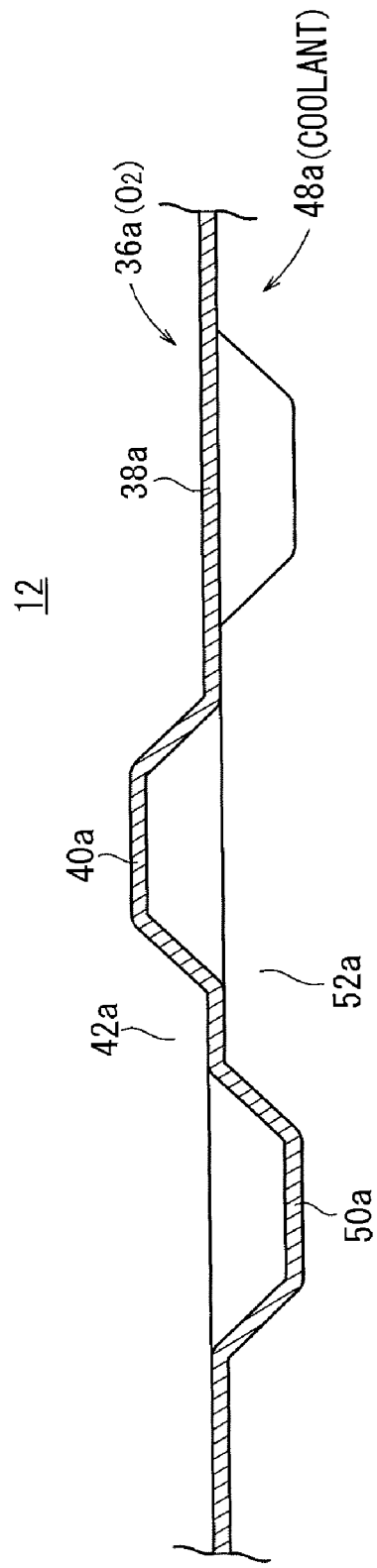
FIG. 6 is a cross sectional view showing the cathode side metal separator, taken along a line VI-VI in FIG. 5.

As shown in FIGS. 5 and 6, the inlet buffer 48*a* includes bosses 50*a* protruding from the intermediate height area 38*a* toward the coolant flow field 32. The bosses 50*a* form an embossed flow field 52*a*. The depth of the continuous guide flow field 42*a* from the intermediate height area 38*a* is the same as the depth of the embossed flow field 52a from the intermediate height area 38a. The inlet buffer 48a is connected to the coolant supply passage 26a through a bridge area 53a (see FIG. 3).

As shown in FIG. 3, the outlet buffer 48b includes bosses 50b protruding from the intermediate height area 38b toward the coolant flow filed 32. The bosses 50b form an embossed flow field 52b. The outlet buffer 48b is connected to the coolant discharge passage 26b through a bridge area 53b.

Figure 7:
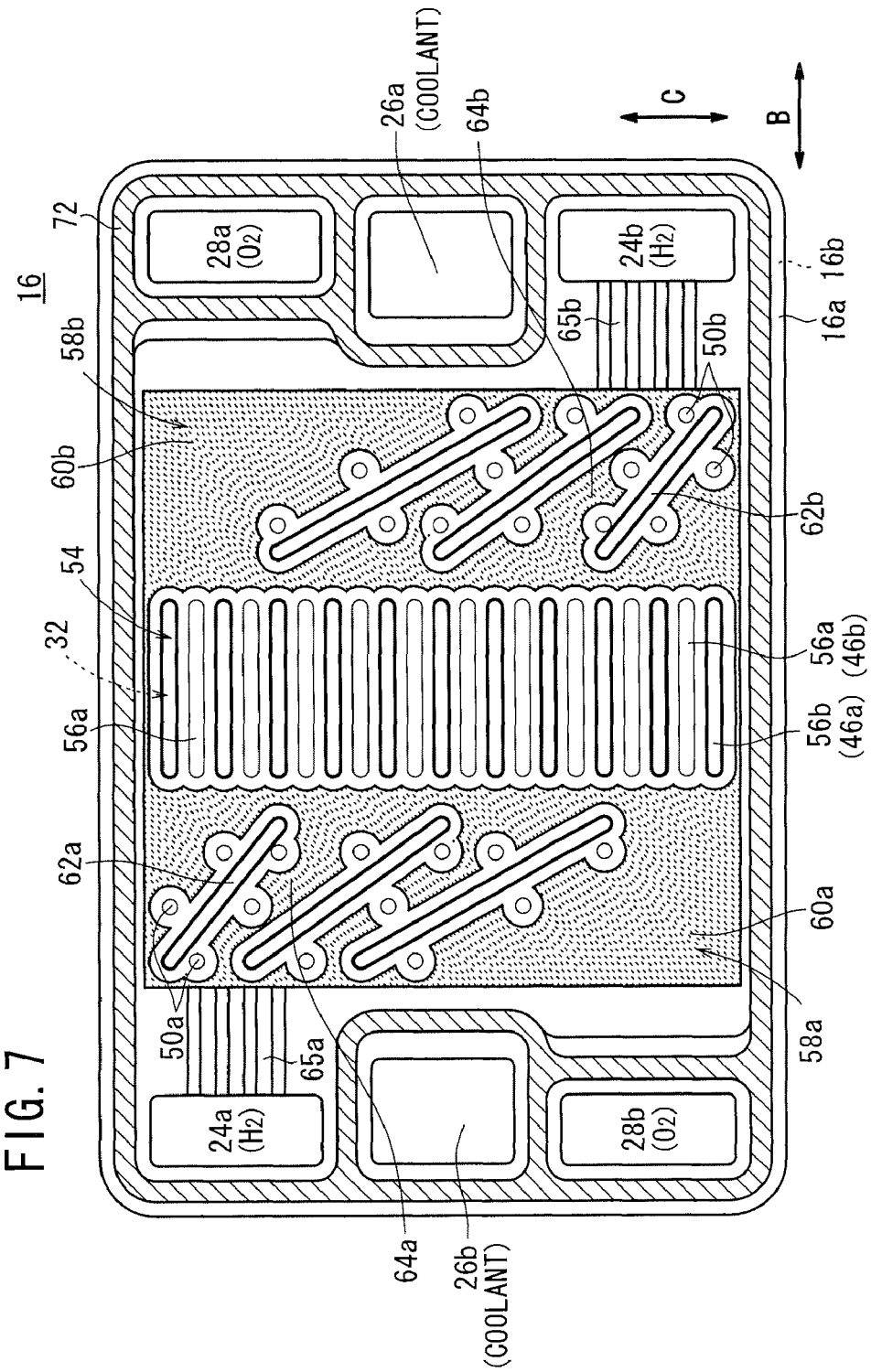
FIG. 7 is a front view showing an anode side metal separator of the fuel cell.

As shown in FIG. 7, the anode side metal separator 16 has a fuel gas flow field (reactant gas flow field) 54 on its surface 16a facing the membrane electrode assembly 14. The coolant flow field 32 is formed on a surface 16b of the anode side metal separator 16, on the back of the fuel gas flow field 54.

The fuel gas flow field 54 includes a plurality of straight flow grooves 56a along the power generation surface extending in the direction indicated by the arrow B. The straight flow grooves 56a are arranged in the direction indicated by the arrow C. An inlet buffer (first buffer) 58a and an outlet buffer (first buffer) 58b are provided adjacent to the inlet and the outlet of the straight flow grooves 56a, respectively. The straight flow grooves 56a are formed between straight flow field ridges (linear flow field ridges) 56b protruding from the surface 16a.

The inlet buffer 58a includes linear guide ridges 62a protruding from an intermediate height area 60a toward the fuel gas flow field 54. The linear guide ridges 62a form a continuous guide flow field 64a. The inlet buffer 58a is connected to the fuel gas supply passage 24a through a bridge area 65a.

The outlet buffer 58b includes linear guide ridges 62b protruding from an intermediate height area 60b toward the fuel gas flow field 54. The linear guide ridges 62b form a continuous guide flow field 64b. The outlet buffer 58b is connected to the fuel gas discharge passage 24b through a bridge area 65b.

As shown in FIGS. 1 and 7, the coolant flow field 32 is formed on the other surface 16b of the anode side metal separator 16, on the back of the fuel gas flow field 54. The coolant flow field 32 has the same structure as that of the cathode side metal separator 12. The constituent elements that are identical to those of the cathode side metal separator 12 are labeled with the same reference numerals, and description thereof will be omitted.

A first seal member 70 is formed integrally with the surfaces 12a, 12b of the cathode side metal separator 12, around the outer end of the cathode side metal separator 12. A second seal member 72 is formed integrally with the surfaces 16a, 16b of the anode side metal separator 16, around the outer end of the anode side metal separator 16.

Operation of the fuel cell 10 will be described below.

First, as shown in FIG. 1, an oxygen-containing gas is supplied to the oxygen-containing gas supply passage 28a, and a fuel gas such as a hydrogen-containing gas is supplied to the fuel gas supply passage 24a. Further, pure water, ethylene glycol, or oil is supplied to the coolant supply passage 26a.

In the structure, in the fuel cell 10, the oxygen-containing gas is supplied from the oxygen-containing gas supply passage 28a to the oxygen-containing gas flow field 30 of the cathode side metal separator 12. The oxygen-containing gas moves from the inlet buffer 36a along the straight flow grooves 34a in the horizontal direction indicated by the arrow B, and the oxygen-containing gas is supplied to the cathode 20 of the membrane electrode assembly 14 for inducing an electrochemical reaction at the cathode 20 of the membrane electrode assembly 14.

The fuel gas flows from the fuel gas supply passage 24a to the fuel gas flow field 54 of the anode side metal separator 16. As shown in FIG. 7, the fuel gas moves from the inlet buffer 58a along the straight flow grooves 56a in the direction indicated by the arrow B, and the fuel gas is supplied to the anode 22 of the membrane electrode assembly 14 for inducing an electrochemical reaction at the anode 22.

Thus, in the membrane electrode assembly 14, the oxygen-containing gas supplied to the cathode 20, and the fuel gas supplied to the anode 22 are consumed in the electrochemical reactions at catalyst layers of the cathode 20 and the anode 22 for generating electricity.

Then, the oxygen-containing gas partially consumed at the cathode 20 of the membrane electrode assembly 14 flows from the outlet buffer 36b, and the oxygen-containing gas is discharged along the oxygen-containing gas discharge passage 28b in the direction indicated by the arrow A. Likewise, the fuel gas supplied to the anode 22 of the membrane electrode assembly 14 is discharged from the outlet buffer 58b into the fuel gas discharge passage 24b.

In the meanwhile, the coolant supplied to the coolant supply passage 26a flows into the coolant flow field 32 formed between the cathode side metal separator 12 and the anode side metal separator 16 of the fuel cell 10, and further flows in the direction indicated by the arrow B. After the coolant flows from the inlet buffer 48a along the straight flow grooves 46a to cool the membrane electrode assembly 14, the coolant is discharged from the outlet buffer 48b into the coolant discharge passage 26b.

In the first embodiment, the cathode side metal separator 12 has the linear guide ridges 40a protruding from the intermediate height area 38a toward the oxygen-containing gas flow field 30 to form the continuous guide flow field 42a and the bosses 50a protruding from the intermediate height area 38a toward the coolant flow field 32 to form the embossed flow field 52a.

Thus, in the oxygen-containing gas flow field 30, since the inlet buffer 36a and the outlet buffer 36b have the continuous guide flow fields 42a, 42b, the oxygen-containing gas does not flow around the water produced in the power generation reaction. In the structure, by the oxygen-containing gas, the water produced in the power generation reaction is easily and reliably discharged from the inlet buffer 36a and the outlet buffer 36b.

Likewise, in the fuel gas flow field 54, since the inlet buffer 58a and the outlet buffer 58b have the continuous guide flow fields 64a, 64b, the fuel gas does not flow around the water produced in the power generation reaction. In the structure, by the fuel gas, the water produced in the power generation reaction is easily and reliably discharged from the inlet buffer 58a and the outlet buffer 58b.

Further, in the coolant flow field 32, the inlet buffer 48a and the outlet buffer 48b have the embossed flow fields 52a, 52b. In the structure, improvement in the performance of distributing the coolant is achieved advantageously. The membrane electrode assembly 14 is held between the inlet buffer 36a, the outlet buffer 36b, and the inlet buffer 58a, the outlet buffer 58b.

Thus, in the fuel cell 10, the power generation performance is not degraded due to the insufficient supply of the oxygen-containing gas and the fuel gas. Further, the desired cooling function is obtained, and the power generation of the fuel cell 10 is performed suitably.

Figure 8:
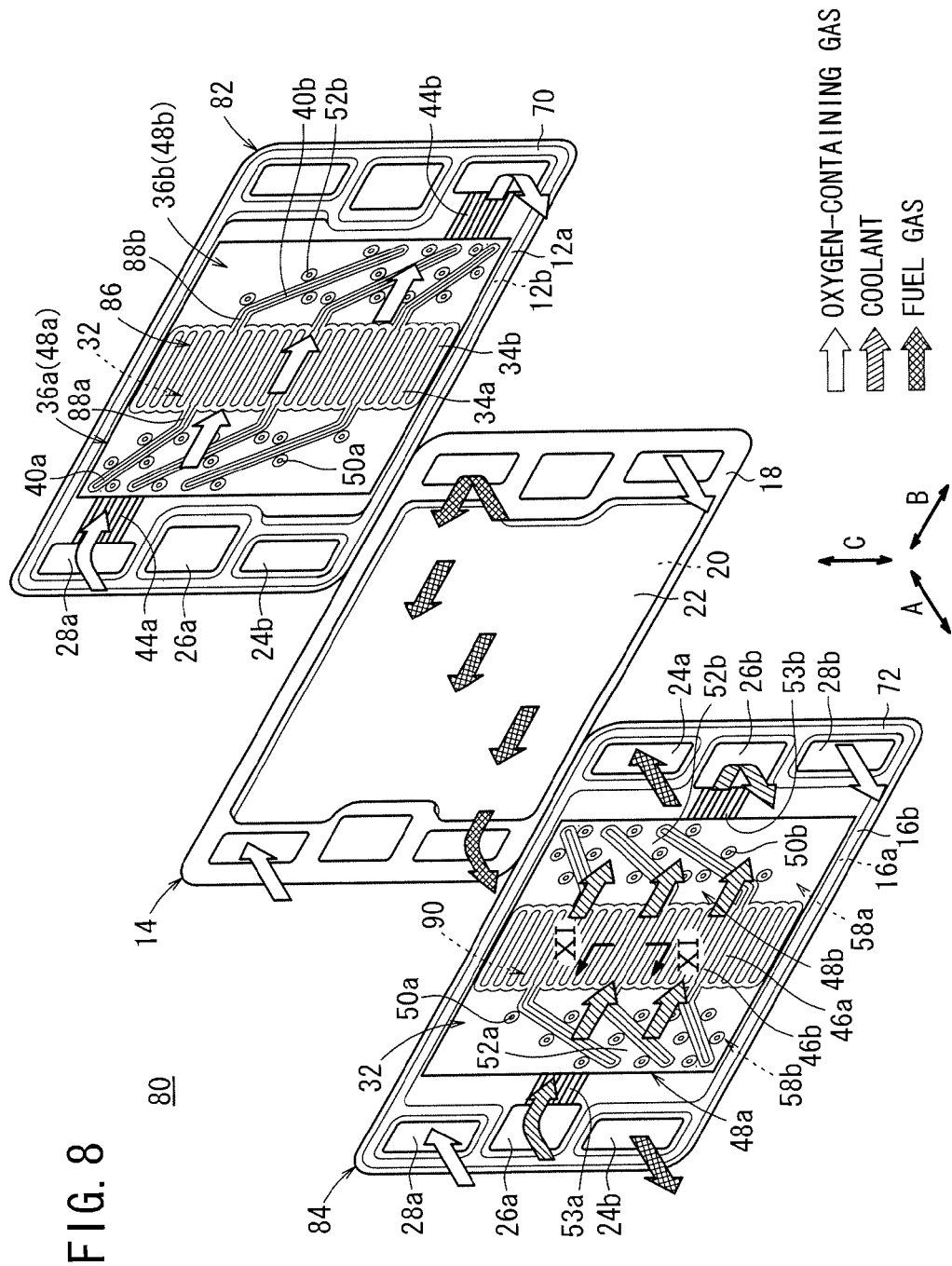
FIG. 8 is an exploded perspective view showing main components of a fuel cell according to a second embodiment of the present invention.

FIG. 8 is an exploded perspective view showing main components of a fuel cell 80 according to a second embodiment of the present invention. The constituent elements of the fuel cell 80 that are identical to those of the fuel cell 10 according to the first embodiment are labeled with the same reference numerals, and description thereof will be omitted. Further, also in third and fourth embodiments as described later, the constituent elements that are identical to those of the fuel cell 10 according to the first embodiment are labeled with the same reference numerals, and description thereof will be omitted.

The fuel cell 80 includes a cathode side metal separator 82, a membrane electrode assembly 14, and an anode side metal separator 84. The cathode side metal separator 82 has an oxygen-containing gas flow field (reactant gas flow field) 86 on its surface 12a facing the membrane electrode assembly 14. The oxygen-containing gas flow field 86 is connected between the oxygen-containing gas supply passage 28a and the oxygen-containing gas discharge passage 28b.

Figure 9:
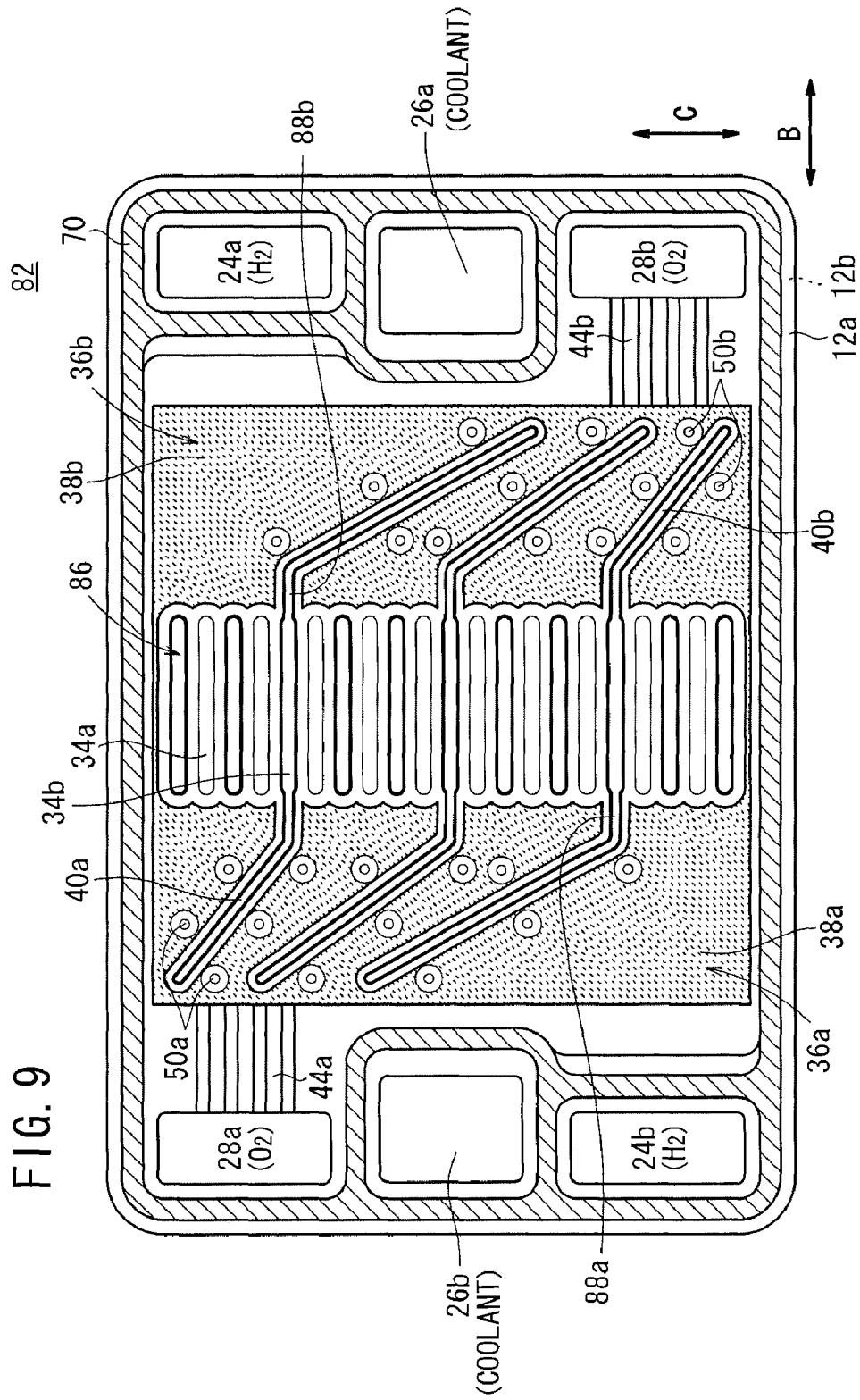
FIG. 9 is a front view showing a cathode side metal separator of the fuel cell.

As shown in FIGS. 8 and 9, the oxygen-containing gas flow field 86 includes a plurality of straight flow grooves 34a, an inlet buffer 36a, and an outlet buffer 36b. Straight flow field ridges 34b forming the straight flow grooves 34a are connected to linear guide ridges 40a, 40b forming the inlet buffer 36a and the outlet buffer 36b, through connection channels 88a, 88b. Preferably, the linear guide ridges 40a, 40b are connected to both ends of same straight flow field ridges 34b.

The anode side metal separator 84 has a fuel gas flow field (reactant gas flow field) 90 on its surface 16a facing the membrane electrode assembly 14. The fuel gas flow field 90 is connected between the fuel gas supply passage 24a and the fuel gas discharge passage 24b.

Figure 10:
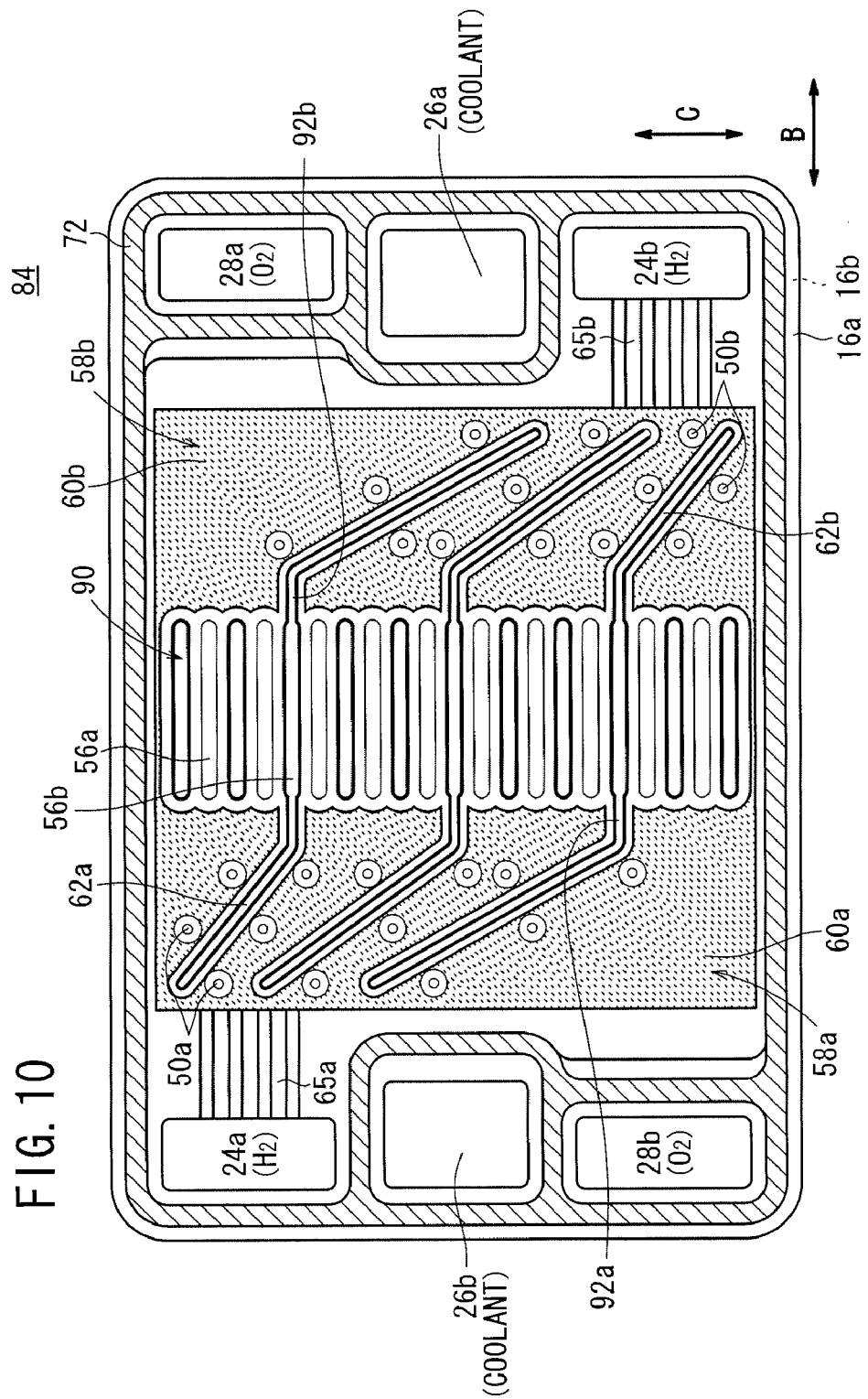
FIG. 10 is a front view showing an anode side metal separator of the fuel cell.

As shown in FIG. 10, the fuel gas flow field 90 includes a plurality of straight flow grooves 56a, an inlet buffer 58a, and an outlet buffer 58b. Straight flow field ridges 56b forming the straight flow grooves 56a are connected to linear guide ridges 62a, 62b of the inlet buffer 58a and the outlet buffer 58b through connection channels 92a, 92b. Preferably, the linear guide ridges 62a, 62b are connected to both ends of the same straight flow field ridges 56b.

In the second embodiment, in the oxygen-containing gas flow field 86, the linear guide ridges 40a, 40b of the inlet buffer 36a and the outlet buffer 36b are connected continuously to the straight flow field ridges 34b of the straight flow grooves 34a through the connection channels 88a, 88b.

In the structure, even if clogging occurs in the outlet buffer 36b by the water produced in the power generation reaction, since a large pressure can be applied to liquid droplets from the inlet buffer 36a through the straight flow grooves 34a, the water can be discharged smoothly. Further, since the linear guide ridges 40a, 40b are connected to both ends of the same straight flow field ridges 34b, the water can be discharged further smoothly.

Moreover, since no gap is present, the bending strength is excellent. In particular, the thickness of the cathode side metal separator 82 and the thickness of the anode side metal separator 84 can be reduced effectively. Further, also in the fuel gas flow field 90, the same advantages as in the case of the oxygen-containing gas flow field 86 is achieved.

Figure 11:
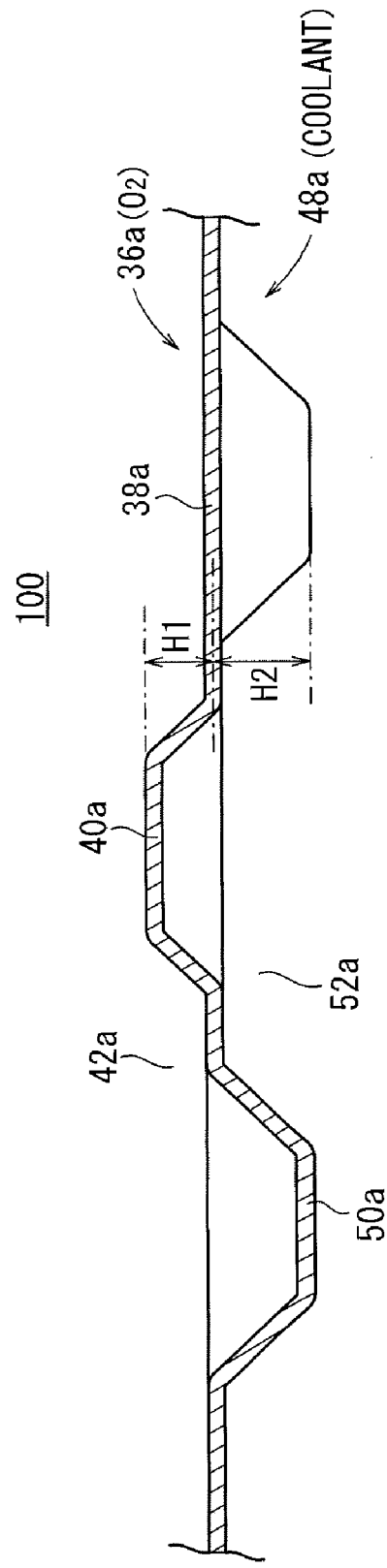
FIG. 11 is a cross sectional view showing a cathode side metal separator of a fuel cell according to a third embodiment of the present invention, taken along a line XI-XI in FIG. 8.

FIG. 11 is a partial cross sectional view showing a cathode side metal separator 100 of a fuel cell according to a third embodiment of the present invention. The cross section corresponds to FIG. 6. Though not shown, the anode side metal separator has the same structure as the cathode side metal separator 100.

In the cathode side metal separator 100, the inlet buffer 36a has linear guide ridges 40a protruding from an intermediate height area 38a toward the oxygen-containing gas flow field 30, and the linear guide ridges 40a form continuous guide flow field 42a. The inlet buffer 48a includes bosses 50a protruding from the intermediate height area 38a toward the coolant flow field 32, and the bosses 50a form an embossed flow field 52a.

In the third embodiment, the depth H1 of the continuous guide flow field 42a from the intermediate height area 38a is smaller than the depth H2 of the embossed flow field 52a from the intermediate height area 38a (H1<H2).

In the third embodiment, the pressure loss in the continuous guide flow field 42a becomes high. Thus, the water can be discharged from the inlet buffer further smoothly.

Figure 12:
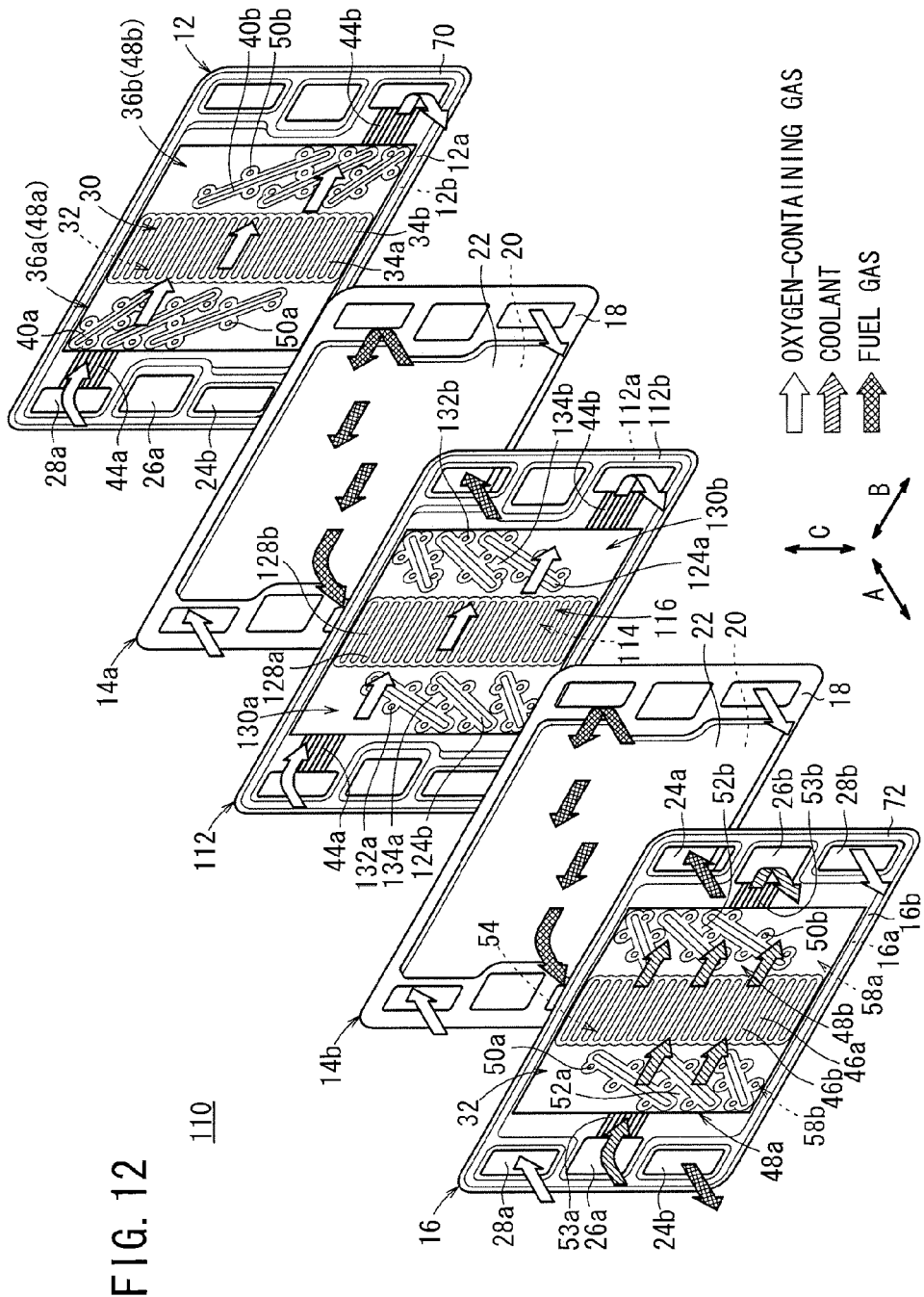
FIG. 12 is an exploded perspective view showing main components of a fuel cell according to a fourth embodiment of the present invention.

FIG. 12 is an exploded perspective view showing main components of a fuel cell 110 according to a fourth embodiment of the present invention.

The fuel cell 110 includes a cathode side metal separator 12, a first membrane electrode assembly 14a, an intermediate metal separator 112, a second membrane electrode assembly 14b, and an anode side metal separator 16.

Figure 13:
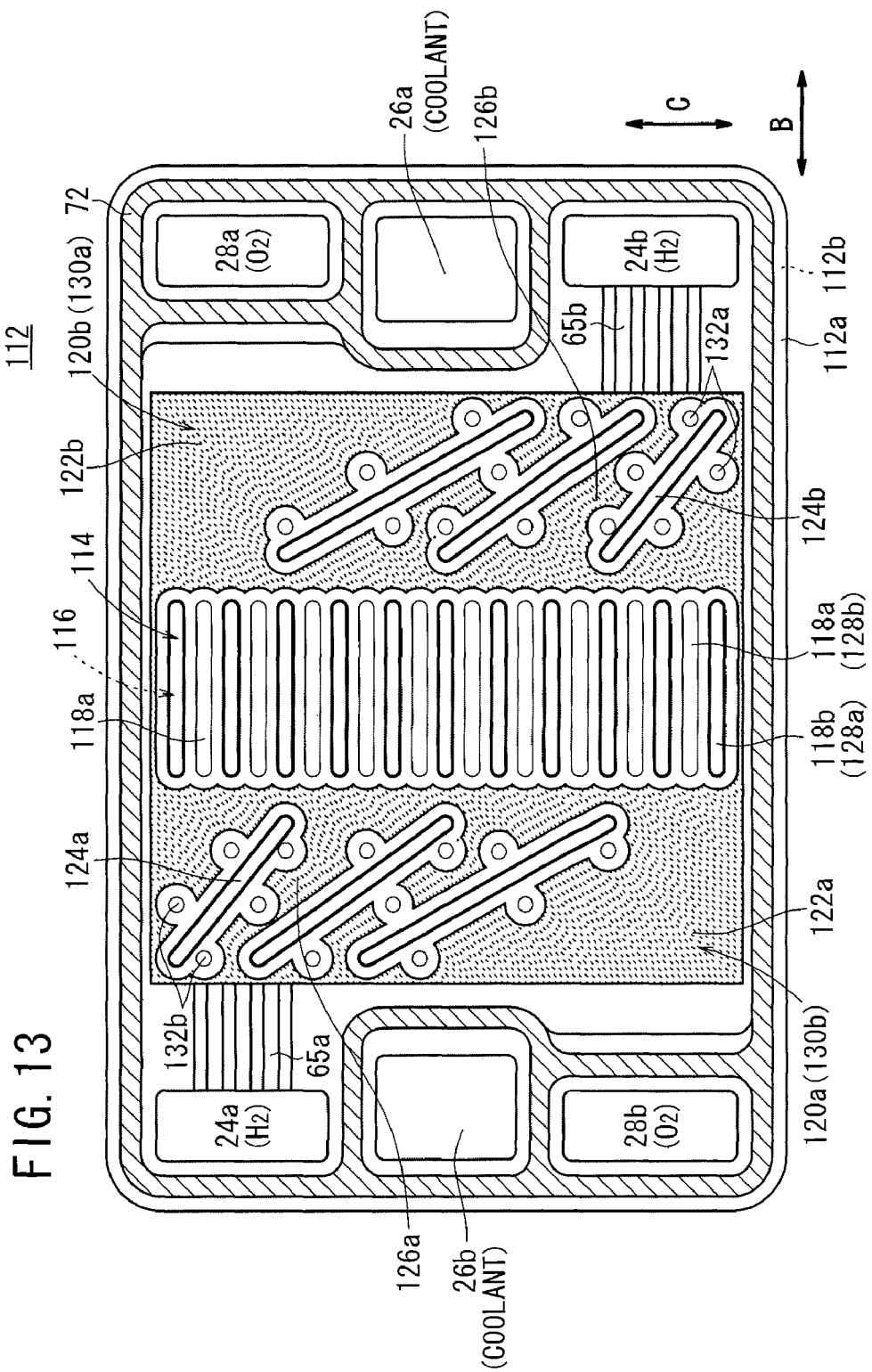
FIG. 13 is a front view showing an intermediate metal separator of the fuel cell.
Figure 14:
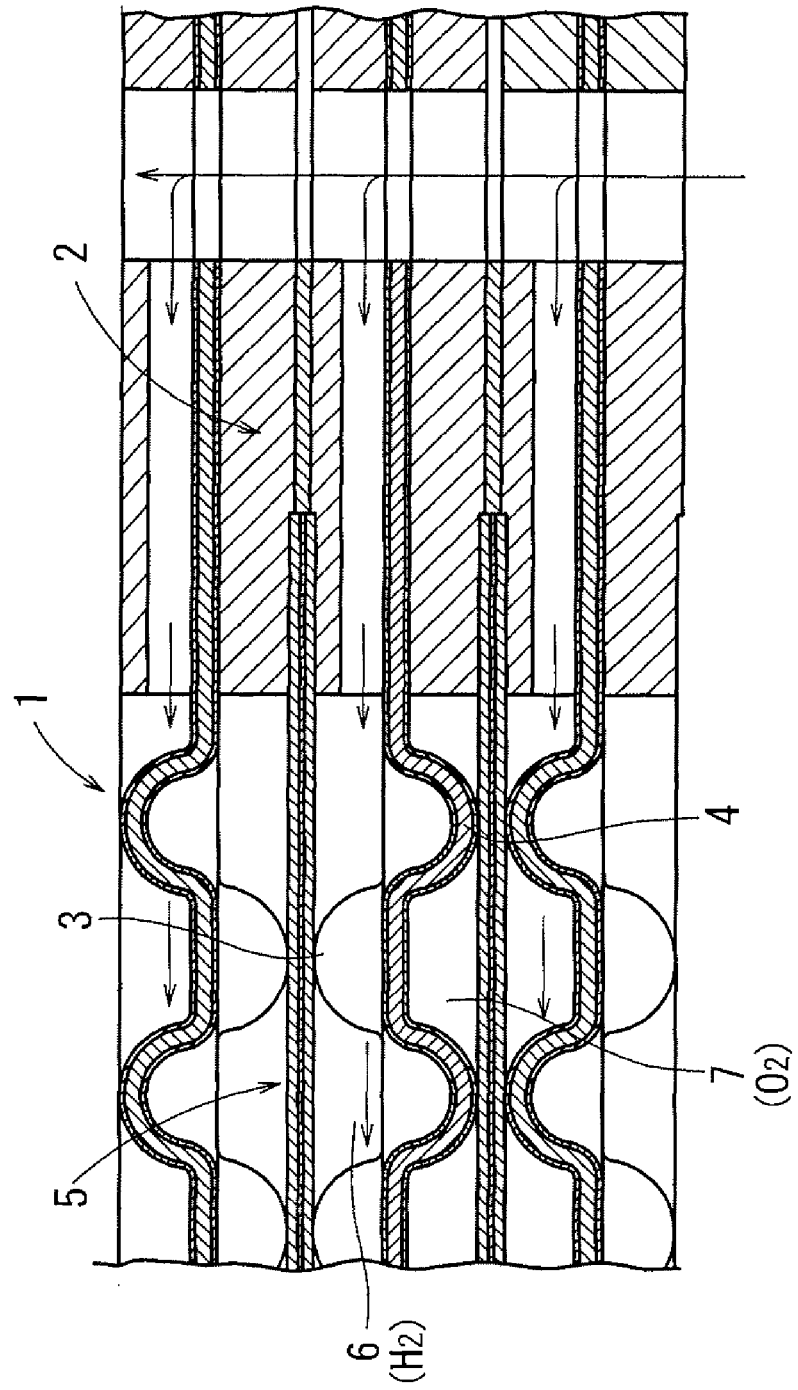
FIG. 14 is a view showing a conventional fuel cell separator.

As shown in FIG. 13, the intermediate metal separator 112 has a fuel gas flow field (reactant gas flow field) 114 on its surface 112a facing the first membrane electrode assembly 14a, and an oxygen-containing gas flow field (reactant gas flow field) 116 on its surface 112b facing the second membrane electrode assembly 14b, on the back of the fuel gas flow field 114.

The fuel gas flow field 114 includes a plurality of straight flow grooves 118a extending along the power generation surface in the direction indicated by the arrow B. The straight flow grooves 118a are arranged in the direction indicated by the arrow C. Further, the fuel gas flow field 114 includes an inlet buffer (first buffer) 120a and an outlet buffer (first buffer) 120b provided respectively adjacent to the inlet and outlet of the straight flow grooves 118a. The straight flow grooves 118a are formed between straight flow field ridges (linear flow field ridges) 118b protruding toward the surface 112a.

The inlet buffer 120a has linear guide ridges 124a protruding from an intermediate height area 122a toward the fuel gas flow field 114. The linear guide ridges 124a form a continuous guide flow field 126a.

The outlet buffer 120b has linear guide ridges 124b protruding from an intermediate height area 122b toward the fuel gas flow field 114, and the linear guide ridges 124b form a continuous guide flow field 126b.

As shown in FIGS. 12 and 13, the oxygen-containing gas flow field 116 includes a plurality of straight flow grooves 128a extending along the power generation surface in the direction indicated by the arrow B. The straight flow grooves 128a are arranged in the direction indicated by the arrow C. Further, the oxygen-containing gas flow field 116 includes an inlet buffer (second buffer) 130a and an outlet buffer (second buffer) 130b provided respectively adjacent to the inlet and outlet of the straight flow grooves 128a. The straight flow grooves 128a are formed between straight flow field ridges (linear flow field ridges) 128b protruding toward the surface 112b.

The inlet buffer 130a has bosses 132a protruding from the intermediate height area 122b toward the oxygen-containing gas flow field 116, and the bosses 132a form an embossed flow field 134a. The outlet buffer 130b has bosses 132b protruding from the intermediate height area 122a toward the oxygen-containing gas flow field 116, and the bosses 132b form an embossed flow field 134b.

In the fourth embodiment, the continuous guide flow fields 126a, 126b protruding toward the fuel gas flow field 114 are formed in the inlet buffer 120a and the outlet buffer 120b on the surface 112a of the intermediate metal separator 112. Therefore, the fuel gas does not flow around the water produced in the power generation reaction.

The embossed flow fields 134*a*, 134*b* protruding toward the oxygen-containing gas flow field 116 are formed in the inlet buffer 130*a* and the outlet buffer 130*b*, on the surface 112*b* of the intermediate metal separator 112. Thus, in the oxygen-containing gas flow field 116, the oxygen-containing gas flows smoothly without any influence by the shapes of the continuous guide flow fields 126*a*, 126*b*.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell formed by stacking an electrolyte electrode assembly and a metal separator in a form of a corrugated plate in a stacking direction, the electrolyte electrode assembly including a pair of electrodes and an electrolyte interposed between the electrodes, a reactant gas flow field as a passage of a fuel gas or an oxygen-containing gas being formed on one surface of the metal separator, a fluid flow field as a passage of the fuel gas, the oxygen-containing gas, or a coolant being formed on another surface of the metal separator, the metal separator comprising:

a first buffer that includes a linear guide protruding from an intermediate height area toward the reactant gas flow field to form a continuous guide flow field, the continuous guide flow field guiding a fuel gas or an oxygen-containing gas from the first buffer to the reactant gas flow field; and a second buffer protruding from the intermediate height area toward the fluid flow field to form an embossed flow field.

2. A fuel cell according to claim 1, wherein the linear guide ridges are connected to linear flow field ridges forming the reactant gas flow field.

3. A fuel cell according to claim 1, wherein a depth of the continuous guide flow field from the intermediate height area is smaller than a depth of the embossed flow field from the intermediate height area.

4. A fuel cell according to claim 1, wherein a reactant gas passage and a fluid passage extend through the metal separator in the stacking direction, the reactant gas passage is connected to the reactant gas flow field through the continuous guide flow field, and the fluid passage is connected to the fluid flow field through the embossed flow field.

5. A fuel cell according to claim 1, wherein the reactant gas flow field and the fluid flow field comprise a plurality of straight flow grooves.

* * * * *